United States Patent
Bryan et al.

(10) Patent No.: US 8,982,578 B2
(45) Date of Patent: Mar. 17, 2015

(54) CONNECTOR SYSTEM AND ASSEMBLY HAVING INTEGRATED PROTECTION CIRCUITRY

(75) Inventors: Lyle Stanley Bryan, Winston-Salem, NC (US); John Steven Cowan, Winston-Salem, NC (US); Thomas Michael Banas, Kernersville, NC (US); Ralph Melvin Cooper, Lewisville, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 670 days.

(21) Appl. No.: 13/269,675

(22) Filed: Oct. 10, 2011

(65) Prior Publication Data

US 2012/0094509 A1    Apr. 19, 2012

Related U.S. Application Data

(60) Provisional application No. 61/455,107, filed on Oct. 14, 2010.

(51) Int. Cl.
| | |
|---|---|
| *H05K 1/11* | (2006.01) |
| *H05K 1/14* | (2006.01) |
| *B60Q 11/00* | (2006.01) |
| *H01R 13/66* | (2006.01) |

(52) U.S. Cl.
CPC .......... *B60Q 11/005* (2013.01); *H01R 13/6666* (2013.01); *H01R 2201/26* (2013.01)
USPC ............ 361/784; 361/760; 361/782; 361/803

(58) Field of Classification Search
USPC ......... 361/160–170, 782–784, 803, 760–763; 307/10.1–10.6, 24, 126
See application file for complete search history.

(56) References Cited

U.S. PATENT DOCUMENTS

| | | | | |
|---|---|---|---|---|
| 4,107,647 | A * | 8/1978 | Yoshino | 340/467 |
| 4,447,801 | A | 5/1984 | Masuda | |
| 4,727,239 | A * | 2/1988 | Lupoli et al. | 219/208 |
| 4,916,431 | A * | 4/1990 | Gearey | 340/479 |
| 5,001,398 | A | 3/1991 | Dunn | |
| 5,644,461 | A | 7/1997 | Miller et al. | |
| 5,841,617 | A * | 11/1998 | Watkins et al. | 361/106 |
| 6,532,193 | B1 * | 3/2003 | Fehse et al. | 367/140 |
| 7,497,737 | B2 | 3/2009 | Mikolajczak | |

(Continued)

OTHER PUBLICATIONS

Http://cache.freescale.com/files/microcontrollers/doc/brochure/BR1871.pdf [retrieved on Dec. 2, 2011], Freescale Semi-Conductors: Automotive Body Control, Document No. BR1871D, pp. 1-2, XP55013804, Apr. 2002.

(Continued)

*Primary Examiner* — Tuan T Dinh

(57) ABSTRACT

A system configured to protect a load within a vehicle includes a plug subassembly and a sensor connector subassembly. The sensor connector subassembly is selectively connectable to the plug subassembly. A circuit board is secured within the sensor connector subassembly. The circuit board includes at least one positive temperature coefficient (PTC) device electrically connected between an activation switch and a load. The circuit board includes at least one circuit to protect against over-voltage or over-current to the load, detect a fault condition of the load, and determine whether the plug subassembly is connected to the sensor connector subassembly.

17 Claims, 3 Drawing Sheets

(56) References Cited

U.S. PATENT DOCUMENTS

2002/0125771 A1    9/2002  Kaminski
2006/0022844 A1*   2/2006  Kawashima ................. 340/943
2008/0272699 A1   11/2008  Capenos

OTHER PUBLICATIONS

Http://cache/freescale.com/files/analog/doc/data_sheet/MC33888. pdf?pspll=1 [retrieved on Dec. 2, 2011], Quad High-Side and Octal Low-Side Switch for Automotive, Document Number: MC 33888, pp. 1-40, XP55013805, Rev. 6.0, Feb. 2007.

Http://cache.freescale.com/files/analog/doc/data_sheet/MC33988. pdf?psll=1 [retrieved on Dec. 2, 2011], Dual Intelligent High-current Self-protected Silicon High Side Switch (8.02Ω), Document No. MC33988, pp. 1-34, XP55013807, Rev. 6.0, Sep. 2010.

International Search Report, International Application No. PCT/US2011/001749, International Filing Date, Oct. 13, 2011.

"Application Note: Circuit Protection Considerations for Automotive Information Busses," Tyco Electronics, 2009.

International Rectifier Programmable Current-Sensing High Side Power Switches website pages.

* cited by examiner

CONNECTOR SYSTEM AND ASSEMBLY HAVING INTEGRATED PROTECTION CIRCUITRY

CROSS REFERENCE TO RELATED APPLICATIONS

This application makes reference to, and claims priority to U.S. Provisional Application No. 61/455,107, entitled "Intelligent Connector System," filed Oct. 14, 2010, the subject matter of which is herein incorporated by reference in its entirety.

BACKGROUND

The subject matter disclosed herein relates to an intelligent connector system.

Many vehicles include safety controls that are configured to ensure protection of the systems and components in the vehicle and to protect the occupants of the vehicle. For example, components are placed within power circuits to protect output circuits and devices downstream of a power surge. Typical systems include fuses, relays and connectors that open when an over-current or over-voltage situation occurs that may damage the downstream circuits. Typically, known connectors used in such applications are simple pass-through connections. Power is supplied to input circuits of a connector by a fused relay and a simple pin connection that transfers power to the output circuits for downstream use. However, the fuse and relay, and their respective connection systems, are normally housed in a remote junction box that increases complexity and components, and poses mounting space issues.

Additionally, in these connection configurations, a short circuit fault typically blows a fuse and continues to blow fuses (if the fuses are removed and replaced) until the short circuit fault is corrected. Additionally, electronic modules that utilize power from an output of a connector typically must individually provide their own over-voltage protection.

Mechanical brake light switches have been used for many years with mixed levels of reliability and convenience. For example, typical brake light switches exhibit persistent wear issues and noise level concerns. One safety concern for a vehicle is the need to keep all the lights, specifically the brake lights, in operational order. Typically, a brake light is connected to at least one fuse. If too much current flows to the brake light through the fuse, the fuse may blow, thereby rendering the brake light inoperative. As such, the fuse(s) within the brake light circuit may cause the brake light to not work properly without the driver knowing. Not only is a malfunctioning or non-operational brake light a safety concern, but it may lead to undesirable law enforcement encounters, such as tickets and/or fines. One solution is a fault detection system with an indicator light to notify the vehicle driver when a brake light is not functioning. Again, however, the fuses within the brake light circuit continue to be unreliable and often need replacement.

SUMMARY

Embodiments provide a single connector and connector system that may provide over-current and over-voltage protection, and also fault detection capabilities.

Certain embodiments provide a system configured to protect a load within a vehicle. The system may include a plug subassembly, a sensor connector subassembly that is selectively connectable to the plug subassembly, and a circuit board secured within the sensor connector subassembly. The circuit board may include at least one positive temperature coefficient (PTC) device electrically connected between an activation switch and a load. The circuit board includes at least one circuit to protect against over-voltage or over-current to the load, detect a fault condition of the load switch, and determine whether the plug subassembly is properly connected to the sensor connector subassembly.

The activation switch may be a brake switch operatively connected to a brake pedal. The load may be a brake lamp.

The circuit board may include a relay switch connected between the at least one PTC and the load. The PTC(s) restricts current from flowing to the relay switch when current at the current through the PTC(s) exceeds a current threshold.

The circuit board may also include a Zener diode connected to a relay coil. The Zener diode is configured to allow current to pass to the relay coil when the Zener diode experiences a breakdown voltage, thereby energizing the relay coil to move the relay switch from a closed to an open position.

The circuit board may also include a metal oxide varistor (MOV) electrically connected between the relay switch and the load (and to ground).

The circuit board may also include a microcontroller electrically connected across the PTC and to a fault indicator. The microcontroller monitors the PTC(s) to determine whether to activate the fault indicator. For example, the microcontroller may monitor a voltage difference across the PTC(s) to determine whether to activate the fault indicator. The fault indicator may include one or more of a visual or audio indicator.

The circuit board may also include an interlock circuit that prevents current from flowing through one or both of the plug subassembly or sensor connector subassembly when the plug subassembly is not properly connected to the sensor connector subassembly. For example, a transistor may be electrically connected to an interlock pin. The transistor is on and connected to ground when the plug subassembly is not properly connected to the sensor connector subassembly. The transistor is off and not connected to ground when the plug subassembly is properly connected to the sensor connector subassembly.

The protection against over-current or over-voltage may be automatically resettable without manual intervention.

Certain embodiments provide a system configured to protect a load within a vehicle. The system may include a first connector subassembly, a second connector subassembly that is selectively connectable to the first connector subassembly, and a circuit board secured within the second connector subassembly.

The circuit board may include at least one positive temperature coefficient (PTC) device electrically connected between a brake switch and a brake lamp. The circuit board may also include a relay switch connected between the PTC(s) and the brake lamp, wherein the PTC(s) restricts current from flowing to the relay switch when current through the PTC(s) exceeds a current threshold. The circuit may also include a Zener diode connected to a relay coil, wherein the Zener diode is configured to allow current to pass to the relay coil when the Zener diode experiences a breakdown voltage, thereby energizing the relay coil to move the relay switch from a closed position to an open position. The circuit may also include a microcontroller electrically connected across the PTC(s) and to a fault indicator, wherein the microcontroller monitors the PTC(s) to determine whether to activate the fault indicator. The circuit may also include an interlock circuit that prevents current from flowing through one or both of the first connector subassembly or second connector subassembly when the first connector subassembly is not properly connected to the second connector subassembly.

The first connector subassembly may be a plug subassembly. The second connector subassembly may be a sensor connector subassembly.

Certain embodiments provide an electrical circuit configured to protect a load within a vehicle. The electrical circuit may include at least one positive temperature coefficient (PTC) device electrically connected between an activation switch and a load, a relay switch connected between the PTC(s) and the load, a Zener diode connected to a relay coil, a microcontroller electrically connected across the PTC(s) and to a fault indicator, and an interlock circuit that prevents current from flowing through one or both of the first connector subassembly or second connector subassembly when the first connector subassembly is not properly connected to the second connector subassembly.

DETAILED DESCRIPTION

Figure 1:
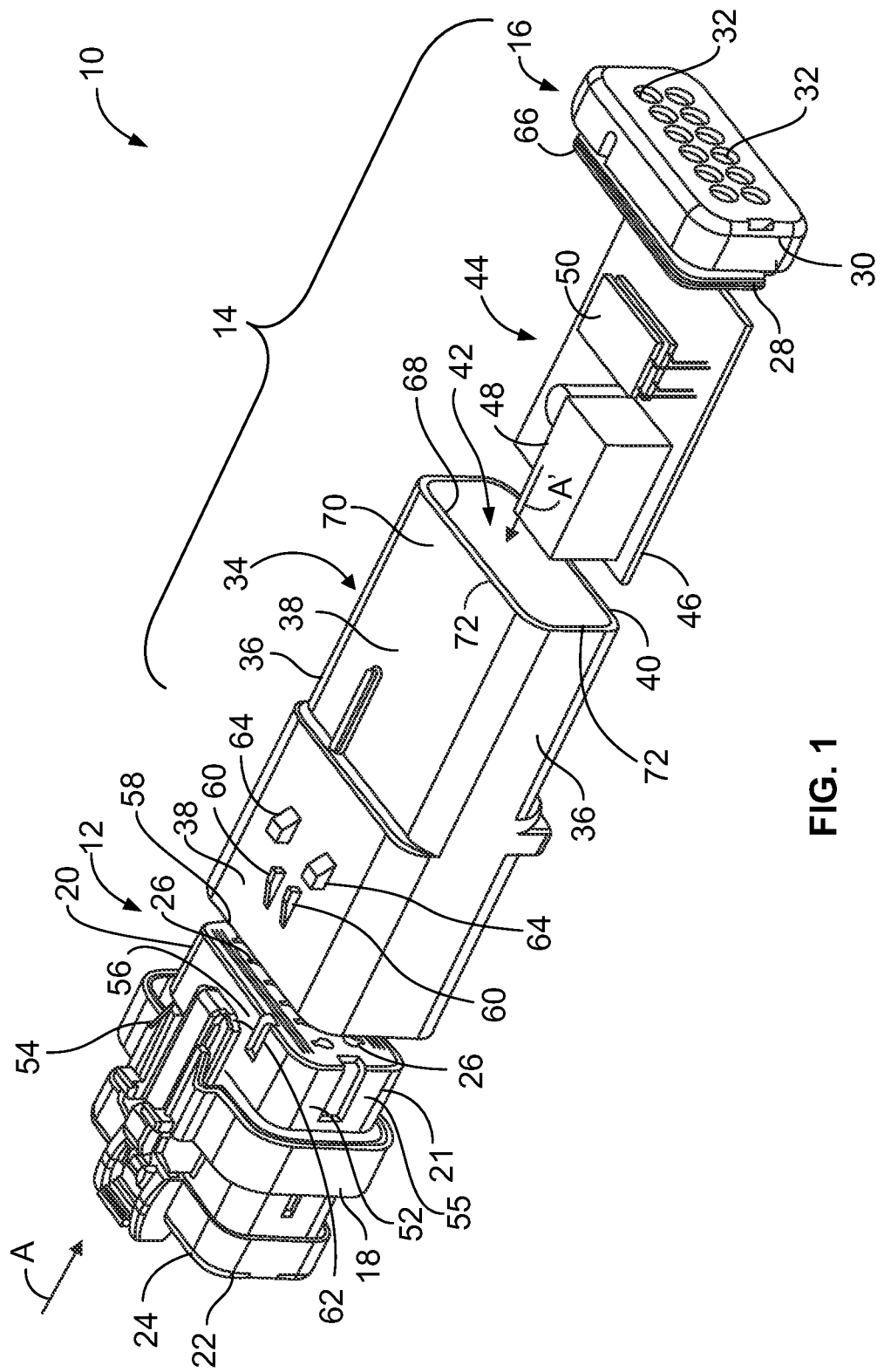
FIG. 1 illustrates an isometric exploded view of a connector assembly, according to an embodiment.

FIG. 1 illustrates an isometric exploded view of a connector assembly 10, according to an embodiment. The connector assembly 10 may include a first or plug subassembly 12 configured to securely mate with a second or sensor connector subassembly 14 having a cap 16.

The plug subassembly 12 includes a main body 18 having a sensor mating face 20 at a mating end 21 and a rear wire exit face 22 at an opposite end 24. As shown, the plug subassembly 12 may be an in-line connector having one or more cavities 26 extending through the plug subassembly 12 from the sensor mating face 20 to the rear wire exit face 22. Each cavity 26 is configured to receive and retain one contact (not shown). Alternatively, the connector assembly 10 may be various other types of connector assemblies that are no in-line.

The cap 16 includes a wire seal 28 and a seal cap 30. The wire seal 28 and the seal cap 30 have one or more openings 32 that receive and retain one or more wires (not shown). As shown in FIG. 1, the plug subassembly 12 has twelve cavities 26 and the cap 16 has twelve openings 32, but any number of cavities 26 and openings 32 may be used.

The sensor connector subassembly 14 is securely mounted between the plug subassembly 12 and the cap 16. The sensor connector subassembly includes a housing 34 having lateral walls 36 integrally formed with upper and lower walls 38 and 40, respectively. The lateral walls 36, upper wall 38, and lower wall 40 define an internal chamber 42. A circuit board assembly 44 is securely mounted within the internal chamber 42.

The circuit board assembly 44 includes a printed circuit board (PCB) 46 having components mounted thereto. For example, the PCB 46 supports relays 48 and one or more positive temperature coefficient devices (PTCs) 50. Each PTC 50 is a passive electronic component used to protect against overcurrent faults in an electronic circuit. In general, each PTC 50 is a non-linear thermistor that acts akin to a resettable fuse and cycles back to a conductive state after a current is removed, acting like a circuit breaker. An exemplary embodiment of the circuit board assembly 44 is described in more detail with respect to FIG. 4. As further described with respect to FIG. 4, the circuit board assembly 44 combines functions that previously required numerous modules or control devices into a single, efficient connector assembly 10. Additionally, the connector assembly 10 may be installed in-line upstream of loads, thereby eliminating the need for remotely located modules or control units.

In order to secure the connector assembly 10 together, the plug subassembly 12 connects to the sensor connector assembly 14 having the cap 16.

The mating end 21 of the plug subassembly 12 is recessed about an outer perimeter 52 to allow the mating end 21 to plug into the internal chamber 42 of the housing 34 of the sensor connector subassembly 14 at an opposite end from the circuit board assembly 44. A latch beam 54 extends over a top of the mating end 21 such that there is a clearance gap 56 between a top surface of the mating end 21 and a bottom surface of the latch beam 54. In this manner, a plug edge 58 of the top wall 38 of the housing 34 is sandwiched between the top of the mating end 21 and the latch beam 54. As the plug subassembly 12 is slid into the housing 34 in the direction of arrow A, the internal surfaces of the housing slide over the outer perimeter 52 of the mating end 21, while the latch beam 54 slides over the plug edge 58 of the top wall 38. With continued urging in the direction of arrow A, the latch beam 54 engages ramped latch teeth 60 extending upwardly from the top wall 38 of the housing 34. With continued urging in the direction of arrow A, the latch beam 54 securely latches or hooks onto the latch teeth 60 and a distal end 62 of the latch beam 54 is stopped from further movement in the direction of arrow A by latch stops 64 upwardly extending from the top wall 38 (additionally, the front end of the housing 34 abuts into a perimetric rim 55 of the main body 18, thereby preventing further movement). The latch beam 54 securely latches the plug subassembly 12 to the sensor connector subassembly 14.

While the latch beam 54 is shown on an upper portion of the plug subassembly 12, additional latch beams may be used. For example, the latch beam 54 may be on an underside and/or lateral portions of the plug subassembly (and latch teeth 60 and latch stops 64 may be formed on the housing 34 accordingly) in addition to, or in lieu of the top surface. Moreover, the housing 34 may include more or less latch teeth 60 than shown. Further, the housing 34 may include more or less latch stops 64. For example, the latch stop may simply be a single bar extending upwardly from the upper wall 38. Optionally, the housing 34 may not include latch stops 64. Additionally, instead of a latching mechanism, the plug subassembly 12 may include tabs, and the housing 34 may include slots, or vice versa, and the plug assembly 12 may snapably secure to the housing 34. Additionally, instead of a latching member, the plug subassembly 12 may secure to the housing 34 through an interference fit, for example. In other words, the plug subassembly 12 may secure to the housing 34 through a wide variety of securing configurations that are not shown or explicitly described.

As noted above, the circuit board assembly 44 is slid into the internal chamber 42 of the housing 34 in the direction of arrow A'. The circuit board assembly 44 may be slid into channels, slots, grooves, or the like and may be secured within the internal chamber 42 through a variety of securing configurations. Once the circuit board assembly 44 is secured within the internal chamber 42, the cap 16 is urged into the internal chamber in the direction of arrow A'. Much like the mating end 21, the outer perimeter 66 of the wire seal 28 is smaller than the internal perimeter 68 of the seal end 70 of the housing 34. The wire seal 66 is configured to sealingly mate and engage into the seal end 70 of the housing, providing a sealing interface therebetween. The main portion of the seal cap 30 fits over the seal end 70, while an internal stop abuts into the outer edges 72 of the seal end 70, thereby preventing the cap 16 from being further urged into the housing 34.

Figure 2:
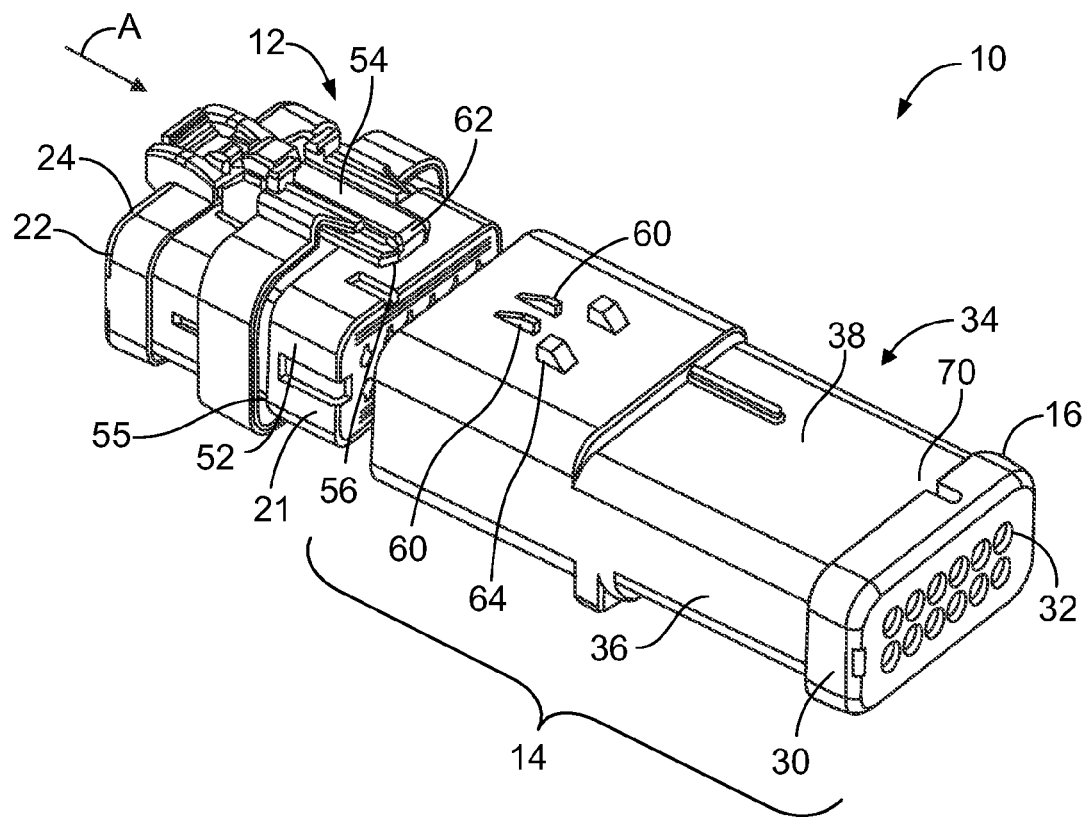
FIG. 2 illustrates an isometric view of connector assembly with a plug subassembly disconnected from a sensor connector subassembly, according to an embodiment.

FIG. 2 illustrates an isometric view of the connector assembly 10 with the plug subassembly 12 disconnected from the sensor connector subassembly 14, according to an embodiment. As shown in FIG. 2, the cap 16 is sealingly secured to the seal end 70 of the housing 34. In order to fully connect the connector assembly 10, the plug subassembly 12 is urged into the housing 34 in the direction of arrow A until the latch member 54 securely latches or hooks onto the teeth 60, as discussed above.

Figure 3:
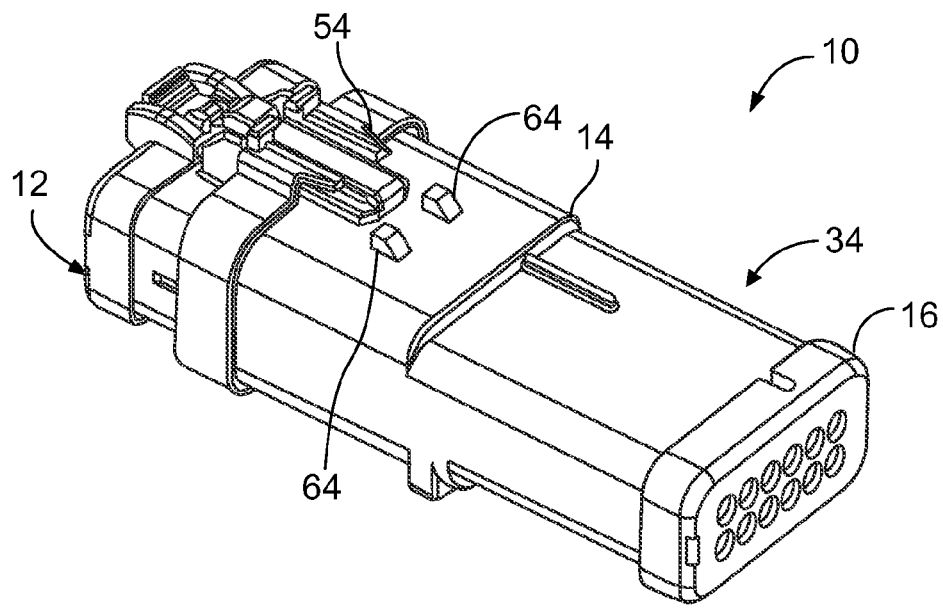
FIG. 3 illustrates an isometric view of a connector assembly in a fully-connected state, according to an embodiment.

FIG. 3 illustrates an isometric view of the connector assembly 10 in a fully-connected state, according to an embodiment. As shown in FIG. 3, the plug subassembly 12 is securely and latchably connected to the sensor connector subassembly 14. The circuit board assembly 44, shown in FIG. 1, is securely connected within the housing 34. Electrical contacts or wires that pass into the openings 32 and the cavities 26 may connect to each other or other components within the connector assembly 10. The contacts or wires may pass over or around the components of the circuit board assembly 44, for example.

Referring to FIGS. 1-3, and as described below, the connector assembly 10 provides multiple functions including safe-connect (for example, an interlock), self-protect (for example, over-voltage and over-current protection) and fault detection. The connector assembly 10 provides resettable over-current and over-voltage protection. The connector assembly 10 may provide integrated fault detection, such as an indication of a non-functioning brake light. As further described below, the connector assembly 10 includes an interlock that prevents power supplied to its circuit outputs if the connector assembly 10 is not properly connected. The connector assembly 10 provides safe handling during connection and disconnection by removing power at the connector assembly 10 output until the connector assembly 10 is properly mated to an electrical system circuit.

While typical resettable over-current protection devices use resettable fusing of the power connection, the connector assembly 10 utilizes PTCs 50, thereby eliminating the need for unreliable fuses.

While the connector assembly 10 is shown including a plug subassembly 12 and a sensor connector subassembly 14 (which includes the cap 16), the connector assembly 10 may include various other subassemblies instead of plug and sensor connector subassemblies. For example, the connector assembly 10 may include a single main housing that retains all of the components noted above. For example, the circuit board assembly 44 may be retained within a single housing having contact openings at either end.

Figure 4:
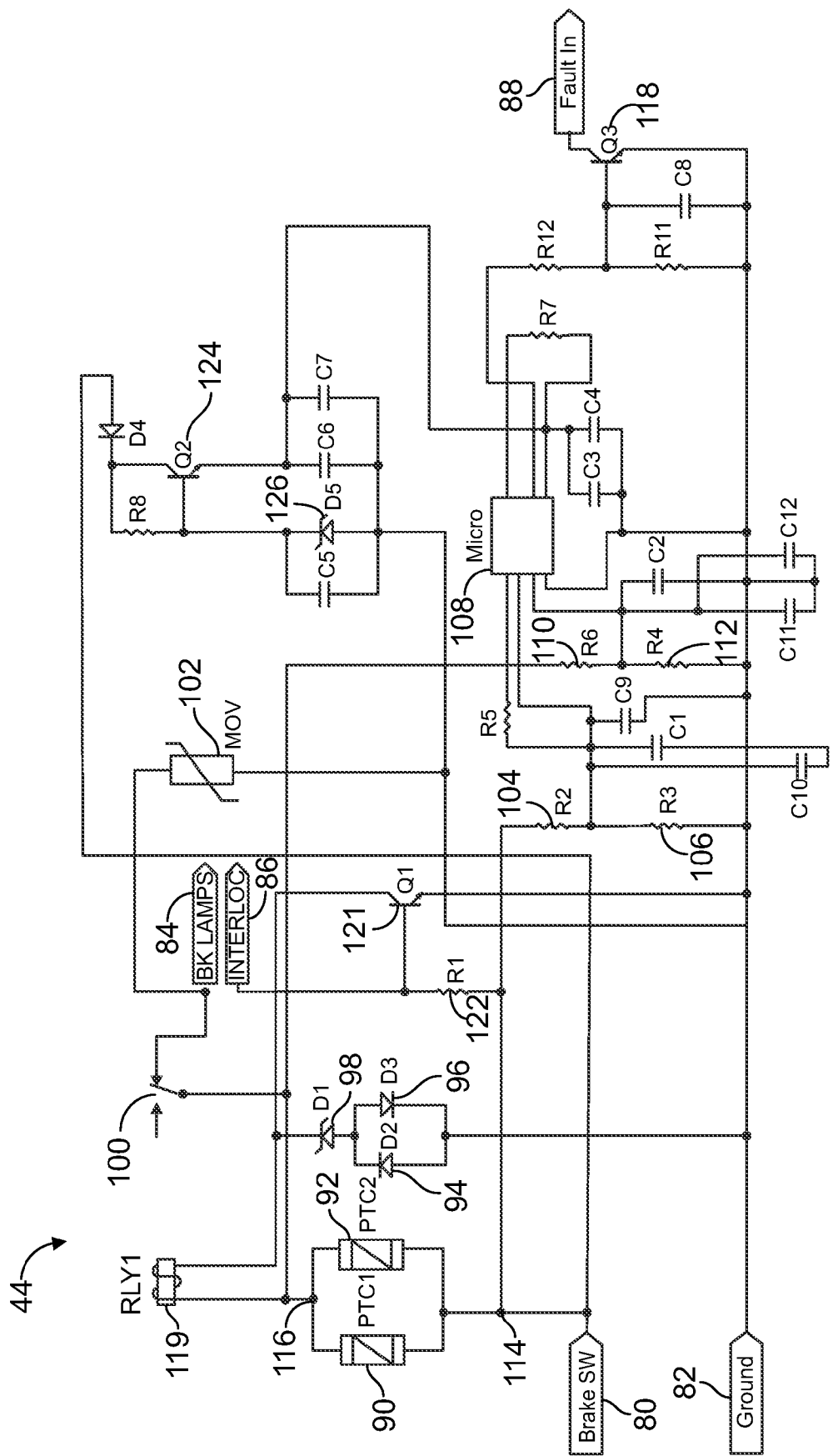
FIG. 4 illustrates a schematic circuit diagram of a circuit board assembly of a connector assembly, according to an embodiment.

FIG. 4 illustrates a schematic circuit diagram of the circuit board assembly 44 of the connector assembly 10, according to an embodiment. The circuit board assembly 10 is electrically connected to an activation or brake switch or pin 80 (operatively connected to vehicle brakes), ground 82, brake lamps 84, an interlock indicator 86, and a fault indicator 88.

As shown in FIG. 4, the brake switch 80 is electrically connected to two parallel PTCs 90 and 92. While two parallel PTCs 90 and 92 are shown, more or less PTCs may be used, depending on the desired current rating. For example, the circuit may include only one PTC, or it may include three, four, or more PTCs. With two PTCs 90 and 92, the current is split up among both PTCs 90 and 92. As such, the two PTCs 90 and 92 provide a higher current rating, than if only one PTC were used. Additional parallel PTCs increase the current rating.

In general, the PTCs 90 and 92 allow a certain amount of current to pass therethrough. For example, each PTC 90 and 92 may allow 5 A of current to pass therethrough (for a total of 10 A). However, once the current passing through the PTCs 90 and 92 exceeds that threshold, the PTCs 90 and 92 act to provide an open circuit. Thus, as shown in FIG. 4, when current is below the current threshold, the current flows from the brake switch 80 through the PTCs 90 and 92, and to the load, in this case, the brake lamps 84. In other words, when functioning properly, when a driver engages the brakes, current flows from the brake switch 80, through the PTCs 90 and 92 and onto the brake lamps 84.

However, when current above a particular current threshold flows to the PTCs 90 and 92, the PTCs 90 and 92 trip, and the resistance increases exponentially. Accordingly, the PTCs 90 and 92 restrict the current flow, and allow only a very small amount of current to pass through the PTCs 90 and 92 to the brake lamps 84. As an example, when the PTCs 90 and 92 are tripped by the over-current condition, the resistance of the PTCs 90 and 92 increases rapidly to greater than 1 MOhms. Using V=IR, 12 Volts/1 MOhms yields 12 microAmps of current passing therethrough. In this manner, the PTCs 90 and 92 protect against over-current flowing to the brake lamps 84. Thus, embodiments provide over-current protection to the load.

Once the current falls below the current or short threshold, the PTCs 90 and 92 automatically reset and allow current to pass therethrough, instead of acting as super-resistors. Therefore, the circuit adapts to changing circumstances, and is automatically resettable With respect to over-voltage, the Zener diode 98 is a special kind of diode that allows current to flow in the forward direction, just as an ideal diode, but will also permit current to flow in the reverse direction when the voltage is above a certain value (a breakdown voltage).

In terms of over-voltage protection, relay switch 100 is in a normally-closed position (that is, current can flow therethrough into the load, that is, the brake lamps 84), as shown in FIG. 4. In this position, the relay coil 119 is not energized, and therefore does not move the relay switch 100 from the closed position to the open position.

When the relay switch 100 is in the closed position, current is able to flow from the brake switch 80, through the PTCs 90 and 92, and then through the closed relay 100 into the brake lamps 84. At the same time, a Zener diode 98 prevents current from flowing therethrough. Instead, current passes from the PTCs 90 and 92 to the relay switch 100 and into the brake lamps 84.

The Zener diode 98 continues to block current from passing therethrough, until the Zener diode 98 reaches a preset breakdown voltage (for example, 28V). However, once the Zener diode 98 reaches the breakdown voltage, for example, a voltage spike, then the Zener diode 98 breaks down, and allows current to pass through the diode 96, and to ground 82. In this manner, current flows from the PTCs 90 and 92 and through the relay coil 119, thereby energizing the relay coil 119, which then magnetically attracts the relay switch 100 from the closed position to an open position, thereby preventing current from flowing to the brake lamps 84. In this manner, the brake lamps 84 are protected from an over-voltage condition that could cause damage.

When the voltage at the Zener diode 98 falls back below the breakdown voltage, the Zener diode 98 blocks current from flowing therethrough, and current stops flowing to the relay coil 119, so that the relay coil 119 is no longer energized. The relay switch 100 then moves back to the closed position and current flows to the brake lamps 84. In this manner, the circuit automatically resets, and adapts to changing circumstances.

Notably, however, when switching between closed and open positions, the relay 100 experiences a certain amount of time lag. For example, the relay 100 may take 3-10 milliseconds to move from a closed to open positions. During this time, in order to prevent a voltage spike from damaging the break lamps 84, a metal oxide varistor (MOV) 102 is connected between the relay switch 100 and the break lamps 84 to ground 82. The MOV 102 may include a bulk semiconductor material (such as sintered granular zinc oxide) that can conduct large current when presented with a voltage above its rated voltage. The MOV 102 is configured to limit voltages to about three to four times the normal circuit voltage by diverting surge current to ground 82 instead of the protected load (that is, the brake lamps 84).

The MOV 102 acts much faster than the relay coil 119 and the relay switch 100. Thus, if the relay switch 100 is starting to open, but is not fast enough to prevent a current spike from passing therethrough in the short time it takes the relay switch 100 to open, the MOV 102 trips and current flow is shunted away from the brake lamps 84, into the MOV 102, and to ground 82. In essence, the MOV 102 provides similar protection to the brake lamps 84 as the relay switch 100, but the MOV 102 reacts much faster. Thus, in the short period of time it takes the relay switch 100 to open, the MOV 102 trips and diverts the current spike to ground 82. After the relay switch 100 opens, the MOV 102 resets and no longer diverts the current spike to ground 82. Thus, the MOV 102 provides over-voltage protection during the 3-10 millisecond time frame that it takes the relay switch 100 to open.

As explained above, when the voltage at the Zener diode 98 falls below the breakdown voltage, the Zener diode 98 acts to close the relay switch 100 so that current may flow to the brake lamps 84. Similarly, when current flowing through the PTCs 90 and 92 falls below the current threshold at which the PTCs 90 and 92 restrict current, the current simply passes through the PTCs 90 and 92, through the closed relay switch 100, and into the brake lamps 84.

Additionally, in a situation where jumper cables are being used to restart a battery or cable heads are reversed, the circuit board assembly 44 provides protection from an improper connection in which power is supplied to ground, and ground is supplied power. In this situation, current will flow from ground 82 (again, power is improperly supplied at this point) to diode 94 (note, current is blocked by diode 96). The current will then flow through the Zener diode 98, which then energizes the relay coil 119, which, in turn, moves the relay switch 100 from the closed position to an open position, thereby providing reverse battery protection. As such, current will not flow to the brake lamps 84. In this manner, the brake lamps 84 are protected from an improper jumper cable connection.

With respect to the brake light fault detection, the brake switch 80 and the PTCs 90 and 92 are electrically connected to resistors 104 and 106. A microcontroller 108 (for example, a processor, integrated circuit, or the like) having a comparator, for example, is electrically connected between the resistors 104 and 106. Resistors 104 and 106 form a voltage divider of input voltage to the PTCs 90 and 92, as do resistors 110 and 112. The voltage drop across the PTCs 90 and 92 is used as inputs to a comparator within the microcontroller 108. If the voltage threshold is exceeded, transistor 118 is turned on, as discussed below. Note, the transistor 124 is used in conjunction with Zener diode 126 as the power supply for the microcontroller 108.

The microcontroller 108 is also electrically connected to the fault indicator 88 through a transistor 118. Additionally, the PTCs 90 and 92 are also electrically connected to the microcontroller 108 through the junction of resistors 110 and 112 and resistors 104 and 106, with resistors 106 and 112 being connected to ground 82. In this manner, the voltage drop across the PTCs 90 and 92 is differentially measured by the microcontroller 108. That is, the voltage at point 114 (before current flows into the PTCs 90 and 92), and the voltage at point 116 (after current flows through the PTCs 90 and 92) are measured by the microcontroller 108. As such, if the microcontroller 108 determines that there is a difference in current flow/voltage drop between points 114 and 116, then the microcontroller may activate the fault indicator 88 (which is connected to a visual or audio signal within the vehicle) to alert an operator that there is a brake light fault.

For example, the microcontroller 108 may determine the voltage difference between the points 114 and 116 (again, V=IR). If the difference between the voltages at points 114 and 116 is too great (for example, the voltage drop across PTCs 90 and 92 is greater than an acceptable amount), then the microcontroller 108 determines that there is too much current flowing through the PTCs 90 and 92, and a fault within the circuit is present. Notably, the PTCs 90 and 92 are used as shunt resistors. During a manufacturing or calibration process, an acceptable voltage drop across the PTCs 90 and 92 (acting as a shunt resistor) is stored in the microcontroller 108. If the microcontroller 108 measures a substantially lower or higher voltage drop (as compared to the acceptable voltage drop) across the PTCs 90 and 92, the microcontroller 108 determines that one or more bulbs of the brake lights are out and will then turn on the fault indicator 88. In either case, the microcontroller 108 may activate the fault indicator 88 (which may be a light-emitting diode (LED), for example, or any other such light emitting device) by turning on the transistor 118, which is electrically connected to the fault indicator 88. If the transistor 118 is off, then the fault indicator 88 is not active, because the transistor 118 is not connected to ground 82. Once the microcontroller 108 determines that the voltage drop is within an acceptable range, the microcontroller 108 turns off the transistor 118, and the fault indicator 88 is deactivated.

If the difference between the voltages at points 116 and 114 is at a predetermined reference voltage range, the microcontroller 108 does not activate the fault indicator 88. Instead, the circuit operates normally.

As noted, the fault indicator 88 may be any device capable of emitting a visual or audio signal. The fault indicator 88 may be an LED within a dashboard of a vehicle. Optionally, the fault indicator 88 may be a standard light bulb, digital readout, or the like. Additionally, the fault indicator 88 may be a speaker that emits an audio signal such as a buzzing sound, or a prerecorded voice message.

As an additional example, a vehicle may have multiple brake lights. For example, each brake light assembly may include three separate and distinct light bulbs. Thus, when a driver steps on the brake, a certain amount of current will flow to the three light bulbs. For example, when lit up, a brake light bulb may have 2 A flowing therethrough. Thus, if the brake light assembly includes three light bulbs, when a driver steps on the brake pedal, there should be a total of 6 A flowing through the brake light assembly. The microcontroller 108 determines the voltage at the PTCs 90 and 92 that is correlated to the normal state of 6 A flowing through the three bulbs of the brake light assembly.

If one of the bulbs is out, however, then there will only be 4 A flowing through the brake light assembly. In this case, the microcontroller 108 detects a fault, namely, that only two of three bulbs are functioning. Therefore, the microcontroller 108 may intermittently activate the transistor 118 to activate the fault indicator 88 in order to alert the driver of this condition. For example, the fault indicator may flash at a first rate. If the microcontroller 108 detects that only one of three bulbs are functioning (for example, 2 A flowing through the brake light assembly), the microcontroller 108 may activate the fault indicator 88 at a second rate that is faster than the first rate. For example, the fault indicator 88 may flash at a double-time rate. If the microcontroller 108 detects that no current is flowing through the brake light assembly based on the voltage measured at points 114 and 116 of the PTCs 90 and 92, then the microcontroller 108 will activate the fault indicator 88 so that it is simply on (that is, a fault indicating device connected to the switch 88 constantly emits a steady light or signal).

Additionally, the circuit is configured to detect whether the connector assembly 10 (shown in FIGS. 1-3) is properly connected. When the plug subassembly 12 is properly mated with sensor connector subassembly 14, the interlock pin 86 is pulled to ground 82. If, however, the connector assembly 10 is not properly mated, the interlock pin 86 will not be grounded. Therefore, the transistor 121 will remain on, thereby allowing current to flow through the relay coil 119. Accordingly, the relay coil 119 will be energized and move the relay switch 100 to the open position.

Referring to FIGS. 1-4, once the plug subassembly 12 is properly connected to the sensor connector subassembly 14 (which includes the cap 16), as discussed above, the interlock pin 86, which may be in the sensor connector subassembly 14, will mate with a reciprocal structure in the plug subassembly 12 and be grounded. That is, when the interlock pin 86 within the sensor connector subassembly 14 is fully mated with a reciprocal pin, for example, in the plug subassembly 12, the interlock pin 86 becomes a ground.

However, when the plug subassembly 12 is not mated, or improperly mated, with the sensor connector subassembly 14, the interlock pin 86 will not mate with the reciprocal structure within the plug subassembly 12. Thus, if the brake switch 80 closes during the non-connected or improperly connected state, current will not flow to the PTCs 90 and 92, or to the pull-up resistor 122. With no current flowing to ground 82, the transistor 121 remains ON providing a path to ground 82. Notably, the transistor 121 also connects to the relay coil 119. Accordingly, the relay coil 119 is then energized, which then causes the relay switch 100 to open. Because the voltage is below the breakdown voltage, the Zener diode 98 blocks current from flowing therethrough. Therefore, when the interlock pin 86 is not mated, the transistor 121 will be on, and current will flow through the PTCs 90 and 92, into the relay coil 119, into the transistor 121, and to ground 82, but not through the Zener diode 98. As long as the transistor 121 is on, there will be no power to the brake lamps 84.

However, when the interlock pin 86 is fully connected, the interlock pin 86 is grounded, and no current flows to the transistor 121. Thus, the transistor 121 turns off, the relay coil 119 is no longer energized, and the relay switch 100 moves to the closed position.

Thus, the interlock pin 86 is configured to ensure that current only flows to the brake lamps 84 when the plug subassembly 12 is properly connected to the sensor connector subassembly 14 (which includes the cap 16). The interlock feature of the connector assembly 10 provides an automatic safety device for handling the assembly 10. That is, when not properly connected, current is not supplied to the brake lamps 84, as discussed above.

While the circuit as shown as having the protections discussed above of the PTCs 90 and 92, Zener diode 98, and the relay switch 100, and the fault detection of the fault indicator 88 and microcontroller 108, and the interlock pin 86, the circuit may include less than all of these features. For example, an embodiment may include only the over-current or over-voltage detection circuit, the interlock indication, or just the fault indication circuit. Further, the circuit may include just two of these features.

Certain embodiments of the connector assembly include a circuit assembly as shown on FIG. 4 that may allow the circuit to operate such that under a short circuit condition, the connector assembly 10 may open (that is, not allow current to flow therethrough) the power circuit connection. The circuit stays open until the short circuit fault is remedied and then automatically returns the circuit to normal operation without additional or manual intervention. The over voltage feature provides over-voltage protection from downstream electronic modules, eliminating the need for individual protection.

In the exemplary embodiment, the fault detection feature is for a non-functioning brake light. Although, various other fault detection circuits may use the connector system described herein. The connector assembly 10, may include an indicator lamp that is activated to warn of the non-functioning brake light. This module is a power pass through only for the brake lamps. Power switching is done external through the brake pedal switch circuit and connected to the brake switch 80. In other words, the brake switch 80 is the input from the brake pedal so that when the driver activates the brakes, this is the switched line input. The interlock switch or pin 86 is a control input, normally connected to ground externally so that if for any reason the connector is separated and the brake switch 80 has power, the transistor 121 will energize the relay coil 119 causing the relay switch 100 to switch from the normally closed state to the normally open state, removing power from the brake lamps 84 to protect from arcing.

Thus, embodiments provide a smart connector system that is configured to protect against over-current and/or over-voltage to a load (such as brake lights). Embodiments also provide a smart connector system configured to automatically detect faults within the system. Moreover, embodiments provide a connector system configured to determine whether the connector is properly mated and connected. Embodiments may provide a connector system performing more than one of these features. For example, embodiments may provide a connector system that performs all of these functions.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A connector assembly with integrated protection circuitry, the assembly comprising:
    a plug subassembly;
    a sensor connector subassembly that is selectively connectable to the plug subassembly; and
    a circuit board secured within the sensor connector subassembly, the circuit board comprising:
        at least one positive temperature coefficient device (PTC) electrically connected between an activation switch and a load, wherein the circuit board includes a circuit to at least one of protect against over-voltage or over-current to the load, detect a fault condition of the load, or determine whether the plug subassembly is properly connected to the sensor connector subassembly;
        a relay switch connected between the at least one PTC and the load, wherein the at least one PTC restricts current from flowing to the relay switch when current at the at least one PTC exceeds a current threshold; and
        a Zener diode connected to a relay coil, wherein the Zener diode is configured to allow current to pass to the relay coil when the Zener diode experiences a breakdown voltage, thereby energizing the relay coil to move the relay switch from a closed to an open position.

2. The assembly of claim 1, wherein the activation switch comprises a brake switch operatively connected to a brake pedal, and wherein the load comprises a brake lamp.

3. The assembly of claim 1, further comprising a metal oxide varistor (MOV) electrically connected between the relay switch and the load.

4. The assembly of claim 1, wherein the circuit board further comprises a microcontroller electrically connected across the at least one PTC and to a fault indicator.

5. The assembly of claim 1, wherein the circuit comprises an interlock circuit having an interlock pin, wherein the circuit prevents current from flowing to the load when the plug subassembly is improperly mated with the sensor connector subassembly.

6. The assembly of claim 1, wherein the at least one PTC comprises at least two PTCs connected in parallel.

7. The assembly of claim 1, wherein the protection against over-current or over-voltage is automatically resettable without manual intervention.

8. The assembly of claim 1, wherein the circuit further provides reverse battery protection.

9. The assembly of claim 4, wherein the microcontroller monitors a voltage difference across the at least one PTC to determine whether to activate the fault indicator.

10. The assembly of claim 4, wherein the fault indicator comprises one or more of a visual or audio indicator.

11. The assembly of claim 5, further comprising a transistor electrically connected to the interlock pin, wherein the transistor is on and connected to ground when the plug subassembly is not properly connected to the sensor connector subassembly, and wherein the transistor is off and not connected to ground when the plug subassembly is properly connected to the sensor connector subassembly.

12. A system configured to protect a load within a vehicle, the system comprising:
    a first connector subassembly;
    a second connector subassembly that is selectively connectable to the first connector subassembly; and
    a circuit board secured within the second connector subassembly, the circuit board comprising:
        at least one positive temperature coefficient (PTC) device electrically connected between a brake switch and a brake lamp;
        a relay switch connected between the at least one PTC and the brake lamp, wherein the at least one PTC restricts current from flowing to the relay switch when current at the at least one PTC exceeds a current threshold;
        a Zener diode connected to a relay coil, wherein the Zener diode is configured to allow current to pass to the relay coil when the Zener diode experiences a breakdown voltage, thereby energizing the relay coil to move the relay switch from a closed position to an open position;
        a microcontroller electrically connected across the at least one PTC and to a fault indicator, wherein the microcontroller monitors the at least one PTC to determine whether to activate the fault indicator; and
        an interlock circuit that prevents current from flowing through one or both of the first connector subassembly or second connector subassembly when the first connector subassembly is not properly connected to the second connector subassembly.

13. The system of claim 12, further comprising a metal oxide varistor (MOV) electrically connected between the relay switch and the brake lamp.

14. The system of claim 12, wherein the microcontroller monitors a voltage difference across the at least one PTC to determine whether to activate the fault indicator.

15. The system of claim 12, wherein the fault indicator comprises one or more of a visual or audio indicator.

16. The system of claim 12, further comprising a transistor electrically connected to an interlock pin, wherein the transistor is on and connected to ground when a plug subassembly is not properly connected to a sensor connector subassembly, and wherein the transistor is off and not connected to ground when the plug subassembly is properly connected to the sensor connector subassembly.

17. The system of claim 12, wherein the at least one PTC comprises two PTCs connected in parallel.

* * * * *